Jan. 7, 1930.    C. E. WEBBER    1,742,979
DISK HARROW LEVELER
Filed Feb. 20, 1929
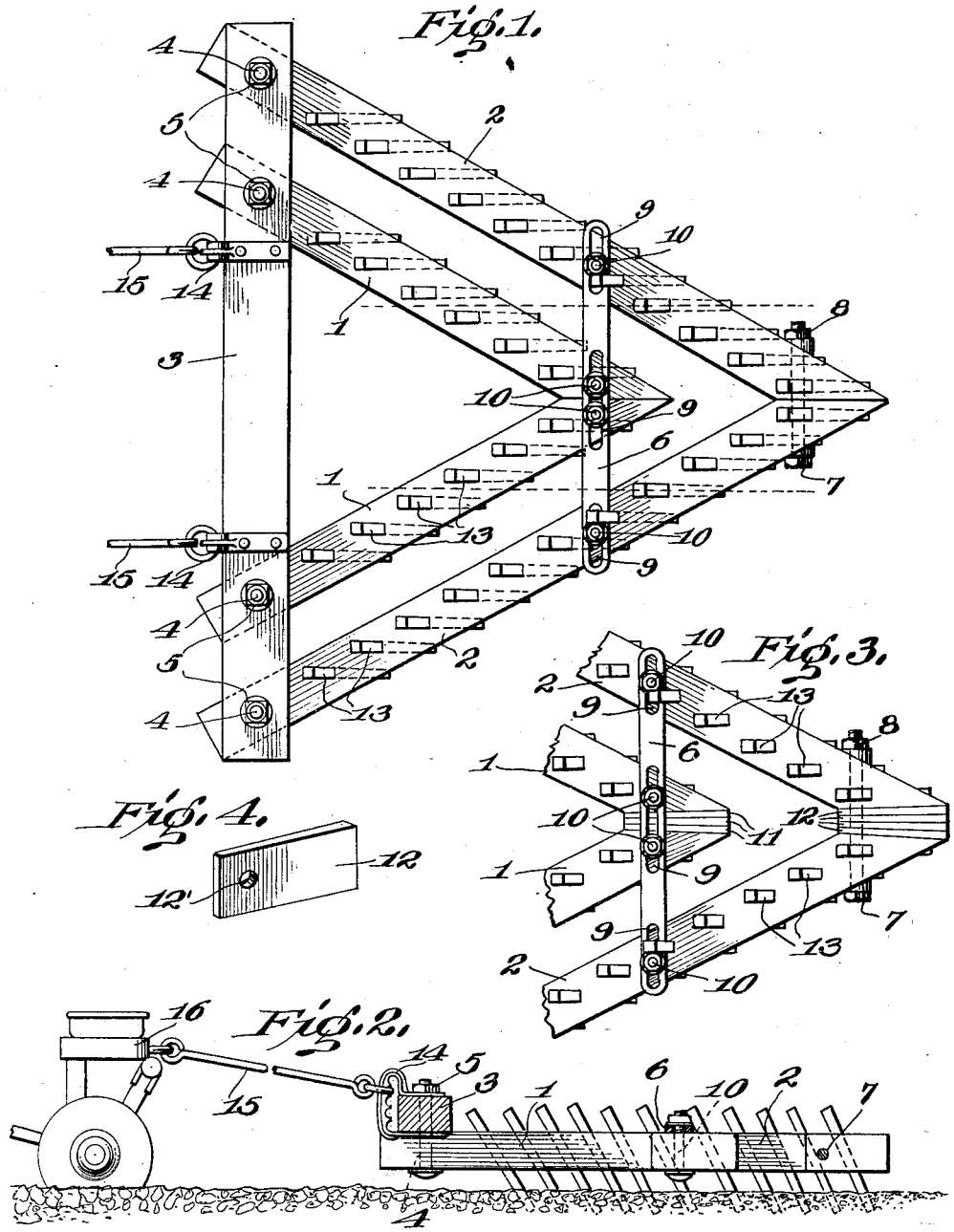
Inventor
Charles E. Webber
By Linton, Kellogg Smith
Attorneys Patented Jan. 7, 1930

1,742,979

UNITED STATES PATENT OFFICE

CHARLES E. WEBBER, OF PONTIAC, ILLINOIS

DISK-HARROW LEVELER

Application filed February 20, 1929. Serial No. 341,412.

This invention relates to improvements in cultivating devices, having for an object to provide a novel form of leveler adapted to be attached to and follow an ordinary type of disk or similar cultivator, whereby to effectually work and break the earth or soil turned thereby, the construction of the same being such, that it will function to effectually disintegrate the soil clods and also, ensure a self-cleaning action of the harrow teeth, whereby they will automatically and quickly rid themselves of "trash", as the harrow is drawn along, hence, avoiding the necessity of stopping and manually cleaning the teeth.

Another and equally important object of the invention may be stated to reside in the provision of a spike tooth harrow or leveler wherein the earth working elements or teeth of the same are so relatively arranged that they may be adjusted with respect to each other in a manner to ensure an effectual disintegration of the soil turned or worked by the preceding cultivator means, being adjusted through a re-arrangement of the tooth carrying bars or frame in a simple and convenient manner.

Yet another object of the invention is to provide a drag harrow or leveler of the character mentioned, in which the draft connection therefor is such that the harrow teeth may be caused to engage with the soil to be worked at different depths, depending upon the character of cultivation or harrowing to be effected thereby.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a top plan view of the improved harrow,

Figure 2 is a vertical longitudinal section through the same showing the harrow connected to a cultivator of the disk type, Figure 3 is a fragmentary detail in top plan showing the manner in which the bars of the V-shaped harrow frames may be adjusted with relation to each other, and Figure 4 is a detail in perspective of one of the plates or shims used in connection with the bars of the V-shaped frames for effecting relative adjustment therebetween.

Having more particular reference to the drawings, in connection with which like characters of reference will designate corresponding parts throughout, the improved harrow may be stated to comprise a substantially triangular shaped frame, as is clearly shown in the Figure 1 and so arranged that the apex portion thereof trail with respect to a forward direction of movement of the device.

This frame consists of harrow tooth carrying bars of substantially V-shaped formation, such as indicated by the numerals 1 and 2, these bars being interpositioned, having their forward and open ends pivotally interconnected through the medium of a draft bar 3 disposed transversely of the device and having combined pivot and securing bolts 4 passed therethrough and through adjacent portions of said V-shaped bars 1 and 2, whereupon locking nuts or similar securing means 5 are turned into engagement therewith, for an obvious purpose.

These bars each comprise two sections and the rearward or apex portions thereof have a mitered connection, as is well shown in the Figure 1, and to render this connection positive and at the same time, adjustable, I provide fastening or securing means, such as now indicated by the numerals 6 and 7; the connection 6 serving as a means for securing the adjacent and trailing ends of the bars 1 in proper position and at the same time, to ensure an immovable positioning of the same with the V-shaped bar 2, while the means 7 may be stated, at this time, to consist of a securing bolt that is passed through complementally arranged openings formed adjacent the rearward or trailing ends of the sections of the bar 2, adapted to be secured in position and against displacement by means of a locking nut 8 turned into engagement with its screw-threaded extremity. In this connection, it is to be noted that the connecting or securing bolt 7 is arranged in a horizontal plane with respect to the trailing ends of the sections of the bar 2 and that by reason of its relative positioning with respect to said bar, it may be readily engaged and disengaged from the complementally arranged openings provided therefor in said bar.

The securing or connecting device 6, consists of a wood or metal bar of appropriate length having a plurality of longitudinally disposed slots 9 formed in the same, certain of these slots being in proximity to the end of the bar 2 and the third slot being intermediately disposed. In arranging this securing bar 6 in functioning position upon the frame construction, it is disposed over and transversely of said bars, as is well shown in the Figure 1, whereupon connecting bolts, generally indicated by the numeral 10, are passed through the slots 9 and through openings provided for the same in adjacent portions of the tooth carrying bars 1 and 2; locking nuts or other suitable securing devices, of course, being turned into engagement with the screw threaded extremities of said bolts. Thus, it will be understood that with the securing bolts through the intermediate slot 9 of the connecting bars 6, a positive connection as between the trailing ends of the sections of the bar 1 will be ensured; furthermore, that with passing of the remaining bolts 10 through the outermost or remaining slots 9 and through openings formed in adjacent portions of the bar 2, a positive connection will be established as between the interpositioned tooth carrying bars 1 and 2. Also, it will be understood that this connection is removable in its character, in that the locking nuts of the various bolts 10 may be removed or loosened and then after proper adjustment of said bolts in their respective slots 9 of the securing bar 6, a securing connection may be effected.

In order that relative adjustment may be effected between the sections of the V-shaped tooth carrying bars 1 and 2, that is, as between the trailing or mitered ends thereof, I may and preferably do employ plate-like compensating devices or shims, such as indicated by the numerals 11 and 12, the shims 11 being of a size and shape to substantially conform to the shape of the meeting ends of the sections of the bar 1 so that they may be positioned therebetween, in the desired number, and thereby effect relative adjustment as between the sections of said bar 1 with the interconnecting of the same through the medium of the securing bar 6 and the bolts 10. Thus, when it is desired to effect a spreading of the apex or trailing end of the V-shaped tooth carrying bars 1, the proper number of shims or compensating plates 11 are arranged beneath the abutting or mitered end portions of the sections of the same and when the proper adjustment has been secured, the securing bolts 10 are passed through the openings provided therefor in the adjacent portions of the sections of said bar 1 and through the intermediately arranged slot 9 of the connecting bar 6, whereupon locking nuts are turned into engagement with the bolts, thereby effecting a positive connection of said sections of the tooth carrying bar with the securing bar 6 and preventing relative movement as between said sections. Also, it will be understood that with the passing of connecting bolts 10 through the remaining or outermost slots 9 of the connecting bar 6 and through the particular openings provided for the same in adjacent portions of the sections of the V-shaped tooth carrying bar 2, the inner tooth carrying bar 1 will be immovably positioned with respect to the outer tooth carrying bar 2. Consequently upon this, after proper adjustment has been effected between the inner and outer tooth carrying bars 1 and 2, they may be positively secured against further relative movement and thereby an effectual functioning of the device will be ensured.

The shims or compensating plates 12 arranged between the abutting or mitered ends of the sections of the tooth carrying bar 2, correspond, in a general fashion, to the shims 11, hereinbefore described. However, these latter shims 12 are necessarily provided with intermediately arranged openings 12' whereby to permit of the passing of the connecting bolt 7 therethrough when it is desired to interconnect said sections of the V-shaped tooth carrying bar 2 and the desired relative adjustment has been effected between said abutting end portions of the same through the insertion of a necessary number of the shims 12. Whereas, the shims 11 may also be provided with openings similar to the openings 12' formed within the shims 12 in order that a bolt (not shown) may pass therethrough for securing such shims in place, I have found in the practical use of my leveler that the connections between the sections of the bar 1 are sufficient for retaining the shims 11 in place therebetween.

The V-shaped and interpositioned tooth carrying bars 1 and 2 of the harrow construction are provided with series equi-spaced rearwardly inclined or trailing harrow or earth working teeth, generally designated herein by the numeral 13. These teeth, it is to be understood, may be of any satisfactory or practical size and design, such as conditions or preference may dictate, and are adapted to be immovably positioned with respect to the particular sections of said V-shaped tooth carrying bars equipped therewith. Each of the earth working teeth, as shown in the Figure 1, are disposed in a rearwardly inclined or trailing manner, and furthermore, the said teeth are so positioned that they are coincidentally disposed with the line of forward draft of the harrow, as is shown in the dot-and-dash lines in the Figure 1. By reason of this peculiar positioning of the harrow teeth 13 with respect to the line of forward draft of the harrow construction, it will be understood that they will be self-cleaning in character, in that with the engagement of the same with "trash" during the drawing of the harrow over the field being cultivated, such "trash" will be caused to positively move thereby and consequently upon this, the necessity of stopping the harrow during an operation for manually removing the accumulated "trash" will be obviated. Also, by reason of the trailing or rearwardly inclined positioning of the harrow teeth with respect to the sections of the V-shaped bars carrying the same, it will be understood by workers skilled in the art, that the tendency of such teeth to rid themselves of "trash" during the drawing of the harrow construction over a field or other surface being cultivated will be materially facilitated. Also, to facilitate a thorough disintegration or breaking of earth clods coming in contact with the harrow teeth, I may and preferably do stagger the series of teeth carried by the sections of the V-shaped bars 1 with respect to those series of teeth carried upon the sections of the bars 2.

With a view toward providing draft connections for the harrow construction, I preferably provide the draft bar 3 with relatively spaced clevises designated by the numeral 14, securing these clevises in relatively vertical relation, to the forward side or marginal portion of the draft bar 3, as is well shown in the Figures 1 and 2 and in proximity to the opposite end portions of said bar. Connecting or draft rods indicated by the numeral 15 are adapted to be adjustably engaged with the clevises 14 and these rods 15, in turn, are extended into engagement with suitable devices carried upon an appropriate portion or portions of a disk harrow or cultivator, generally indicated herein by the numeral 16. Consequently upon the adjustable engagement of the draft rods 15 with the clevises 14 of the draft bar 3, it will be appreciated that the earth working teeth 13 of the improved harrow construction may be caused to engage with the soil to be worked thereby at different depths, this depth engagement of the earth working teeth, of course, being dependent upon the positioning of the draft rods 15 with respect to their particular clevises 14.

As is known to workers skilled in this art, disk harrows are provided with a number of disks for harrowing the soil over which they pass and these disks are arranged in gangs. These gangs of disks, whether singular or in tandem arrangement, are so positioned that ridges are left upon the ground between the gangs of disks and by attaching my improved leveler behind such disk harrows, the spike teeth thereof will cause the ground so harrowed by the disk to be properly leveled and everything will be drawn towards a common center so that the spacings left between the gangs of disks will be properly worked. My improved leveler is also made to extend slightly beyond the opposite ends of the disks of the harrow whereby the ridges usually left at each outer end of the disk harrow will be properly worked. It will also be noted that by providing an adjustable connection between the apex ends of the spike carrying bars, the spikes thereof may be so arranged as to take care of the center ridge left by either single or tandem disk harrows, but if a relatively wide adjustment is needed at the apex ends of the spike bars, these shims are entirely eliminated and the connecting bar 6 is sufficient to hold the spike carrying bars or sections thereof in their proper adjusted positions. It is also to be noted that the broader or forward end of my leveler is provided with two draft connections, whereby it may be attached to a disk harrow so as to prevent the same from oscillating back and forth and the ridges left by the preceding disk harrow whether they be at the ends and center thereof will be properly leveled.

Manifestly, the construction shown is capable of considerable modification, and such modification as is within the scope of my claims I consider within the spirit of my invention.

I claim:—

1. A disk harrow leveler comprising a draft bar, pairs of cooperating interpositioned earth working teeth carrying bars, each having one of their ends pivotally secured to the end portion of the draft bar and in spaced relation to each other, and means for adjustably bringing and holding together the free ends of said cooperating teeth carrying bars of each pair.

2. A disk harrow leveler comprising a draft bar, pairs of cooperating interpositioned earth working teeth carrying bars, means for pivotally connecting one end of each of said cooperating teeth carrying bars directly to said draft bar, a connecting bar disposed parallel to said draft bar, means for adjustably connecting said cooperating bars of each pair with said connecting bar, and means for adjustably bringing and holding together the free ends of said cooperating teeth carrying bars of each pair.

3. A disk harrow leveler comprising a draft bar, pairs of cooperating interpositioned earth working teeth carrying bars, the earth working teeth of said bars being arranged in rearwardly inclined fashion and disposed coincidentally with the normal forward line of draft, means for pivotally connecting one end of each of said cooperating teeth carrying bars to the end portion of said draft bar, and means for adjustably bringing and holding together the free ends of said cooperating teeth carrying bars of each pair.

4. A disk harrow leveler comprising a draft bar, pairs of cooperating interpositioned earth working teeth carrying bars, each having one end pivotally secured to the end portion of the draft bar, means for adjustably bringing and holding together the free ends of said cooperating teeth carrying bars of each pair, and spaced clevises secured to said draft bar intermediately of the pivotal connections of the latter with the teeth carrying bars.

5. A disk harrow leveler comprising relatively interpositioned V-shaped frames, each frame being formed of cooperating sections, said cooperating sections of each frame being relatively adjustable with respect to each other, removable means for securing the sections of each frame in adjusted positions, certain of said removable means having bracing engagement with respect to the interpositioned frames, a draft bar disposed across the open ends of said V-shaped frames and having pivotal engagement with the adjacent portions of each section thereof, adjustable draft connections carried by said bar, and series of earth working teeth carried by the sections of each of said frames and arranged in a rearwardly inclined fashion and disposed coincidentally to the normal forward line of draft of the leveler.

6. A disk harrow leveler comprising relatively interpositioned V-shaped frames, each frame being formed of cooperating sections, the sections of each of said frames being relatively adjustable with respect to each other, removable means engaged through the sections of one of said frames for securing the same in adjusted relation, a connecting bar, securing devices adjustably engaged with said connecting bar and adapted to have connecting engagement with the adjacent portions of each section of the innermost of said interpositioned V-shaped frames and to be connected to portions of each section of the outermost V-shaped frame, a draft bar disposed across the open ends of said V-shaped frames and pivotally connected to adjacent portions of the sections thereof, and a plurality of earth working teeth carried by each section of the V-shaped frames and arranged in rearwardly inclined fashion and disposed coincidentally to the normal forward line of draft of the leveler.

In witness whereof I have hereunto set my hand.

CHARLES E. WEBBER.